United States Patent
Saidulu et al.

(10) Patent No.: US 10,487,279 B2
(45) Date of Patent: Nov. 26, 2019

(54) PRODUCTION OF HIGH YIELD OF SYNGAS THROUGH REGENERATION OF COKED UPGRADING AGENT

(71) Applicant: Indian Oil Corporation Limited, Bandra (East), Mumbai (IN)

(72) Inventors: Gadari Saidulu, Faridabad (IN); Sadhullah Mukthiyar, Faridabad (IN); Sayapaneni Gopinath Bhanuprasad, Faridabad (IN); Vineeth Venu Nath, Faridabad (IN); Doosa Hima Bindu, Faridabad (IN); Satheesh Vetterkunnel Kumaran, Faridabad (IN); Debasis Bhattacharyya, Faridabad (IN); Brijesh Kumar, Faridabad (IN); Biswapriya Das, Faridabad (IN)

(73) Assignee: Indian Oil Corporation Limited, Mumbai (IN)

(*) Notice: Subject to any disclaimer, the term of this patent is extended or adjusted under 35 U.S.C. 154(b) by 0 days.

(21) Appl. No.: 15/240,336

(22) Filed: Aug. 18, 2016

(65) Prior Publication Data

US 2017/0130150 A1    May 11, 2017

(30) Foreign Application Priority Data

Nov. 6, 2015   (IN) .......................... 4240/MUM/2015

(51) Int. Cl.
*C10G 2/00*  (2006.01)
*C10J 3/46*  (2006.01)
(Continued)

(52) U.S. Cl.
CPC .............. *C10J 3/721* (2013.01); *C01B 3/02* (2013.01); *C01B 3/382* (2013.01); *C10G 11/182* (2013.01); *C10G 11/185* (2013.01); *C01B 2203/0244* (2013.01); *C01B 2203/0283* (2013.01); *C01B 2203/107* (2013.01); *C01B 2203/1058* (2013.01); *C10J 2300/0943* (2013.01);
(Continued)

(58) Field of Classification Search
CPC .... C01B 3/02; C01B 3/24; C01B 3/28; C01B 3/30; C01B 3/34; C01B 3/38; C10G 11/182; C10G 11/185; C10J 2300/0943; C10J 2300/0956; C10J 2300/0959; C10J 3/721
See application file for complete search history.

(56) References Cited

U.S. PATENT DOCUMENTS 3,856,662 A * 12/1974 Greenwood ............. B01J 8/003
                                                      208/150
4,950,823 A *  8/1990 Harandi .................... C07C 2/66
                                                      203/DIG. 9
(Continued)

OTHER PUBLICATIONS

Li et al. "Influence of ceria and nickel addition to alumina-supported Rh catalyst for propane steam reforming at low temperatures" Applied Catalysis A: General 357 (2009) 213-222 (Year: 2009).*

*Primary Examiner* — Amber R Orlando
*Assistant Examiner* — Syed T Iqbal
(74) *Attorney, Agent, or Firm* — Workman Nydegger

(57) ABSTRACT

The present invention relates to a process of increasing syngas production during an upgradation process of petroleum residual oil by circulation of rejuvenated upgrading material through a heat removal zone such as an Auxiliary Reformer and by regeneration of spent upgrading material.

11 Claims, 2 Drawing Sheets

(51) Int. Cl.
  *C10G 5/00* (2006.01)
  *C10J 3/72* (2006.01)
  *C01B 3/02* (2006.01)
  *C10G 11/18* (2006.01)
  *C01B 3/38* (2006.01)

(52) U.S. Cl.
  CPC .................. *C10J 2300/0956* (2013.01); *C10J 2300/0959* (2013.01)

(56) References Cited

U.S. PATENT DOCUMENTS

| | | | | |
|---|---|---|---|---|
| 4,959,334 A | * | 9/1990 | Mauleon | C10G 11/182 208/164 |
| 5,565,090 A | * | 10/1996 | Gosling | C10G 35/14 208/134 |
| 2004/0122267 A1 | * | 6/2004 | Sher | C01B 3/38 585/324 |

* cited by examiner

PRODUCTION OF HIGH YIELD OF SYNGAS THROUGH REGENERATION OF COKED UPGRADING AGENT

FIELD OF THE INVENTION

The present invention relates to the process for production of high yields of syngas through regeneration of coked upgrading material/agent. The present invention further relates to high yields of syngas by circulation of rejuvenated upgrading material/agent through a heat removal zone such as Auxiliary Reformer.

BACKGROUND OF THE INVENTION

Synthesis gas, which is also known as syngas, is a mixture of gases comprising primarily of carbon monoxide (CO) and hydrogen ($H_2$), and very often some carbon dioxide. Generally, syngas may be produced from any carbonaceous material. In particular, biomass such as agricultural wastes, forest products, grasses, and other cellulosic material may be converted to syngas.

Syngas is a platform intermediate in the chemical and bio-refining industries and has a vast number of uses. Syngas can be converted into alkanes, olefins, oxygenates, and alcohols such as ethanol. These chemicals can be blended into, or used directly as, diesel fuel, gasoline, and other liquid fuels. Syngas can also be directly combusted to produce heat and power. The substitution of alcohols in place of petroleum-based fuels and fuel additives can be particularly environmentally friendly when the alcohols are produced from feed materials other than fossil fuels.

Improved methods are needed to more cost-effectively produce syngas. Methods are also desired for producing syngas at a greater purity and with desirable ratios of $H_2$ to CO to facilitate the conversion of syngas to other products, such as ethanol.

While residue oil can be upgraded in petroleum refineries via coking process, there is still a substantial need in the art for more efficient and cost effective methods for achieving the resid upgradation. There is also a need to increase the amount of liquid products and to decrease the amount of gas and/or coke make, when upgrading such feedstocks. Delayed Coking & fluid coking processes produces high amount of low value petroleum coke, which is typically 1.5 times of Concarbon, which means, processing of heavy crude oil having 40% VR with 27% Concarbon will produce 16 MT of coke as by product per every 100 MT of crude oil. The price of coke is very low as compared to crude oil price, approximately ⅒th of crude oil price and it erodes the refinery margin heavily. In the current scenario, sustaining the refinery margin in view of ever deteriorating quality of crude oil mainly depends on the profit margin gained from the upgradation of the residue to yield more liquid and less of low value byproducts such as coke.

The greatest challenge in upgradation of highly contaminated residue feedstock is depositing feedstock impurities on the solid particles without slippage of these impurities and achieving sustainable operation with good run length of the unit. Residue contains more concarbon residue and hence requires larger surface for depositing these impurities otherwise the same may deposit on the walls of the reactor leading to shutdown of the unit. Ultimately, it limits the residue content in the feedstock.

Another challenge in in-situ partial regeneration of coke/coke reforming process is maintaining the reaction rate suitable for commercial production of syngas. Coke not only deposits on the outer surface of upgrading material but also deposits in upgrading material pores during residual upgrading processing. The coke deposited on the upgrading material blocks the pores; hence it reduces the overall surface area available for contacting the regeneration agent. As concarbon of residual oil increases, multilayered coke formation/deposition on upgrading material takes place. The multilayer coke difficult to gasify and requires higher temperatures for gasification similar that of petroleum coke gasification. The coke on the upgrading material top layer/surface is easy to react; the remaining inner layer of coke is difficult for regeneration due to increased diffusion resistance. The partial regeneration of top layer of coke follows the homogeneous model while, partial regeneration of inner layer of coke follows shrinking core model with increased diffusion resistance, which is rate determining step.

Therefore, there is a need to upgrade heavy residual oils containing higher Concarbon and metal concentrations to lighter products through a more efficient & cost effective method. Such methods should produce higher valuable products such as higher grade oils, high quality syngas, etc. without producing petroleum coke as by product.

SUMMARY OF THE INVENTION

The present invention relates to a process of increasing syngas production during an upgradation process of petroleum residual oil, the process comprising:
a) introducing spent upgrading agent from a Riser along with steam and air or oxygen containing gases, to a Reformer for production of syngas;
b) burning residual coke present on partially rejuvenated upgrading agent obtained from the Reformer in a Combustor;
c) introducing rejuvenated upgrading agent from the Combustor, and a hydrocarbon in presence of steam and air or oxygen containing gases to an Auxiliary Reformer for production of additional syngas; and
d) circulating rejuvenated upgrading agent from the Auxiliary Reformer to the Riser.

The present invention further relates to a process of increasing syngas production during an upgradation process of petroleum residual oil, the process comprising:
a) introducing spent upgrading agent from a Riser to a Reformer along with steam, optionally air or oxygen containing gases for production of syngas;
b) burning of residual coke present on partially rejuvenated upgrading agent obtained from the Reformer in a Combustor;
c) circulating rejuvenated upgrading agent from the Combustor back to the Reformer;
d) introducing rejuvenated upgrading agent from the Reformer and a hydrocarbon in presence of steam and air or oxygen containing gases to an Auxiliary Reformer for production of additional syngas; and
e) circulating rejuvenated upgrading agent from the Auxiliary Reformer to the Riser.

The present invention furthermore relates to a system for increasing syngas production during an upgradation process of petroleum residual oil, the system comprising:
a) a cracking zone comprising a Riser [1, 1A], with means for injecting hydrocarbon residue [6, 6A], means for injecting fluidizing cum atomizing medium including steam [7, 7A], means for injecting lift steam [8, 8A], transfer line for injecting rejuvenated upgrading material [22, 23A] and a Stripper [2, 2A] for separating the cracked products [9, 9A] and spent upgrading material [10, 10A];

b) a two stage regeneration zone comprising of a Reformer [3, 3A] and a Combustor [4, 4A]; and c) a heat removal zone comprising an Auxiliary Reformer [5, 5A] for producing additional syngas by reforming of hydrocarbon stream while utilizing excess heat removed from rejuvenated upgrading material [18, 19A].

DESCRIPTION OF THE INVENTION

Figure 1:
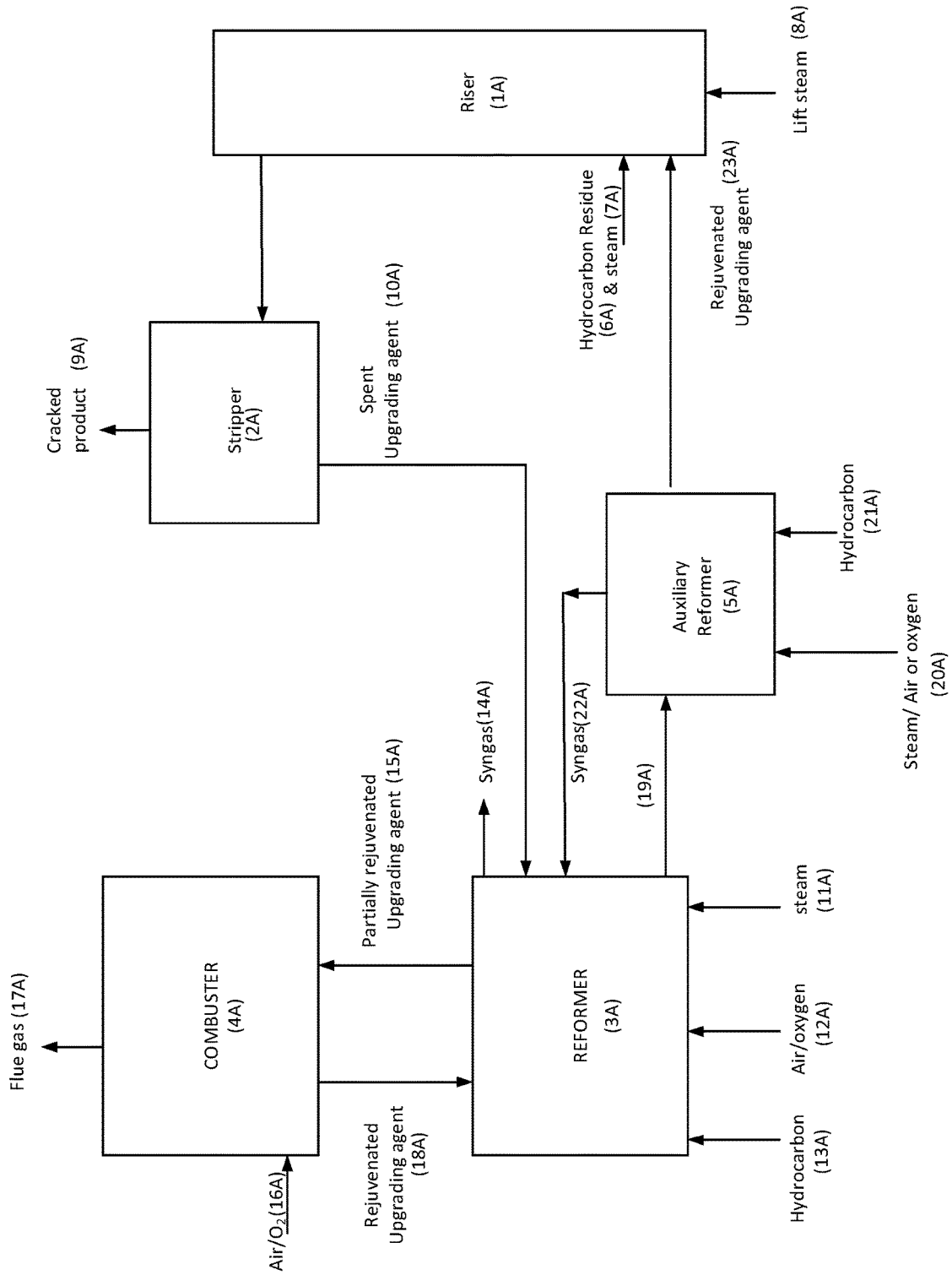
FIG. 1 is a schematic diagram of process comprising of upgrading residual oil containing high concentration of concarbon and metals into higher grade oil and high yield of synthesis gas.

While the invention is susceptible to various modifications and/or alternative processes and/or compositions, specific embodiment thereof has been shown by way of example in the drawings and tables and will be described in detail below. It should be understood, however that it is not intended to limit the invention to the particular processes and/or compositions disclosed, but on the contrary, the invention is to cover all modifications, equivalents, and alternative falling within the spirit and the scope of the invention as defined by the appended claims.

The graphs, tables, formulas, protocols have been represented where appropriate by conventional representations in the drawings, showing only those specific details that are pertinent to understanding the embodiments of the present invention so as not to obscure the disclosure with details that will be readily apparent to those of ordinary skill in the art having benefit of the description herein.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

The present invention relates to the process for upgradation of petroleum residual oil feedstock containing high concentration of concarbon and heavy metals by employing an upgrading material to remove one or more of the impurities from the feedstock and production of high yield of syngas during regeneration of coked upgrading material.

The process includes a cracking zone comprising of Riser [1], Stripper [2], a two stage regeneration zone comprising of Reformer [3] and Combustor [4], and a heat removal zone comprising Auxiliary Reformer [5] at the exit of Combustor [4] (FIG. 1) for removing excess heat from the rejuvenated upgrading material [18] by conducting endothermic reforming of hydrocarbon streams [20] with steam and optionally with air/oxygen [19] before being sent to riser [1].

Cracking zone may comprise a means for injecting residue hydrocarbon stream [6], a means for injecting atomizing medium such as steam [7], a means for injection of lift steam [8], and a means i.e. transfer line for introducing a rejuvenated upgrading material [22] into the Riser [1]. The rejuvenated upgrading material coming from the regeneration zone will be lifted by fluidization medium in the Riser. Instantaneous feedstock vaporization takes place as soon as the residue hydrocarbon stream contacts with the rejuvenated upgrading material. One of the challenges of residue cracking in a fluidized bed reactor is quick vaporization of the residue feedstock. Residue contains significant amount of multi ring aromatics. These carbonaceous compounds are principally the high boiling hydrocarbons with boiling point above 550° C. and more particularly, the boiling point of asphaltenes & phorphyrins will be much higher above 800° C. During the cracking, rarely these compounds get vaporized and are deposited as coke on the surface of the upgrading material/upgrading agent. Coke thus formed deposits in the pores of upgrading material and therefore blocks the mouth of the pore and thus resulting in reduced surface area. As the concarbon values of feedstock increases, the coke production increases. The coke lay down on the upgrading material may vary depending upon the circulation rate of the upgrading material, feed vaporization, which in turn depends on the outlet temperature of the cracking reactor.

Reformer temperature is maintained below 850° C. It is seen that at Reformer temperatures below 650° C., methane production is favored.

Prior to injection of hydrocarbon feedstock oil, the said feedstock is pre-mixed with superheated steam and then dispersed with use of a nozzle by applying a high shear force so that it makes tiny droplets while injecting the same into cracking reactor. Steam dispersion in hydrocarbon feedstock reduces hydrocarbon partial pressure and average molecular weight and boiling point of the mixture of hydrocarbons and steam and hence the maximum amount of feedstock is vaporized quickly at feed mix zone temperature. Apart from feed atomization, some amount of steam can also be injected at the downstream of feed injection point to reduce the hydrocarbon partial pressure in the cracking reactor. Total Steam to Oil ratio in the present invention will be in the range of 0.3 to 1.5 wt/wt.

Upgrading material or upgrading agent (Upgrading material and upgrading agent are interchangeably used in the present invention) of the present invention are basically porous fluidizable micro spherical solid particles belong to Geldart Group A classification. Typical range of particle size and particle density of upgrading material is about 20-200 microns & 1200-1600 kg/m$^3$. The upgrading material possesses surface area above 60 m$^2$/g and preferably in the range of 80-400 m$^2$/g. The upgrading material mainly consists of the microspheres composed of alumina, silica alumina, kaolin clay or a mixture thereof. These microspheres could be prepared using the conventional art of FCC catalyst preparation i.e. by preparing the solution of desired chemical composition followed by spray drying and calcination. Typically, these materials have very less acidic cracking activity as characterized by MAT activity of less than 10. However, our invention is not limited to low activity upgrading material alone. Total deposited metals on the circulating upgrading material would be as high as 1-2 wt % and metal level on the circulating upgrading material is controlled by adjusting the fresh upgrading material addition rate to the system.

As the residue feedstock contacts the rejuvenated upgrading material in the Riser, feedstock gets vaporized and cracking of hydrocarbons takes place along the length of the Riser to yield lighter hydrocarbon products. Residue molecules are generally made of different layers of sheets bonded by heteroatoms such as metals, nitrogen, etc. Metals, nitrogen, sulfur, are generally present as porphyrins, and/or concarbon.

These molecules are of very high molecular weight and generally do not vaporize below 550° C. During cracking, these compounds are deposited as coke on the surface of the upgrading material. Coke thus formed deposits in the pores of upgrading material and therefore blocks the surface area. As the concarbon values of feedstock increases coke production increases. The coke lay down on the upgrading material may vary depending upon the circulation rate of the upgrading material, feed vaporization, which in turn depends on the outlet temperature of the cracking reactor. Therefore, it is essential to maintain the higher outlet temperature of the reactor, preferably in the range of 550 to 650° C. for ensuring maximum amount residue feedstock is vaporized.

The cracked products [9] and spent upgrading material/agent [10] are separated in a Stripper [2] and the spent upgrading agent [10] (the spent upgrading material and spent upgrading agent are interchangeably used in the present invention) is transferred to Reformer [3] after stripping off the hydrocarbons present in interstitial space and pores of the upgrading material. The spent upgrading material [10] constitutes 1 to 3 wt % coke depending on the type of feed & operating conditions and coke is evenly dispersed on the top of the upgrading material in the form of a thin layer. Unlike petroleum coke, as the coke produced in the cracking reactor is in nascent form & is dispersed on the high surface area upgrading material in the form of a thin layer, it is highly reactive.

The coke deposited on the upgrading material is regenerated partially by introducing steam [11] and air/oxygen [12] into the Reformer for production of syngas [14]. The present invention also provides a method for enhancing the production of syngas by introducing hydrocarbon stream [13] into the Reformer. The partially rejuvenated upgrading material/partially rejuvenated upgrading agent[15] is then transferred to the Combustor [4] for burning the residual coke with a stream of oxygen containing gases [16] to produce flue gas [17] and rejuvenated upgrading material or rejuvenated upgrading agent [18] (FIG. 1). Herein the rejuvenated upgrading material and rejuvenated upgrading agent are interchangeably used in the present invention.

The Reformer [3] has a means for transferring the partially rejuvenated upgrading material [15] to the Combustor [4], where the residual coke is combusted using oxygen containing gases. The transfer of partially rejuvenated upgrading material to the Combustor [4] is done using a lift line. The circulation of partially rejuvenated upgrading material through the lift line is controlled by a plug valve located at the bottom of the lift line. The rejuvenated upgrading material [18] from Combustor [4] is transferred to Auxiliary Reformer [5] where the upgrading material/agent is cooled down and is then transferred to the Riser.

The present invention relates to the removal of impurities, i.e., Concarbon, nickel, vanadium, sodium, basic nitrogen and sulfur present in high boiling low value resid streams by depositing the same on the upgrading material in the form of coke, the greatest challenge is depositing feedstock impurities on the solid particles without slippage and achieving sustainable operation with good run length of the unit. Residue contains more concarbon residue and hence requires larger surface on regenerated upgrading material for depositing these impurities otherwise the same will deposit on the walls of the reactor and leading to shutdown of the unit. Ultimately, it limits the residue content in the feedstock. Another challenge in in-situ partial regeneration of coke/reforming process with steam is maintaining the reaction rate suitable for commercial production of syngas. Coke not only deposits on the surface of upgrading material but also deposits inside the upgrading material pores during residua upgrading processing. The coke deposited on the upgrading material blocks the pores; hence it reduces the overall surface area available for contacting the regeneration agent. As concarbon of residual oil increases, multilayered coke formation/deposition on upgrading material increases, the multilayer coke behaves like petroleum coke leading to the requirement of very high temperature regeneration environment. The coke on the upgrading material top layer/surface is easy to react and be consumed; the remaining inner layer of coke is difficult for regeneration due to increased diffusion resistance. The regeneration of top layer of coke with steam follows the homogeneous model while, regeneration of inner layer of coke with steam follows shrinking core model with increased diffusion resistance, which is rate determining step.

One possible method to overcome these issues is to increase the solid catalyst circulation rate to the cracking reactor, which means increased surface area available for deposition of coke precursors on the circulating solids resulting in lower delta coke and reduced coke deposition on riser wall. Delta coke is defined as the difference between coke on spent upgrading material and coke on rejuvenated upgrading material. Lower delta coke is achieved by providing an auxiliary Reformer [5] to reduce the temperature of the rejuvenated upgrading material before admitting into cracking reactor (Riser) and thereby increasing the circulation rate of upgrading material.

The present invention discloses a method for increasing the circulation of upgrading material to the Riser [1] by removing heat from the rejuvenated upgrading material [18] coming from the Combustor [4] in Auxiliary Reformer [5] for endothermic reforming of hydrocarbons [20] with steam and with air/oxygen containing gases [19] to produce synthesis gas [21] (FIG. 1). The temperature of Combustor is maintained in the range of 750-950° C. If this upgrading material [18] is directly allowed to contact the residue feedstocks, the ratio of upgrading material to the residue feedstock will be in the range of 5-10 wt/wt. Considering a coke yield of 30 wt % for a neat high sulphur VR having a CCR of 22-25 wt %, the delta coke will be in the range of 3-6 wt %. Due to high delta coke there is a high possibility of coke deposition on the walls of riser. Since in the present invention, the rejuvenated upgrading material [18] is cooled to the temperature in the range of 650 to 750° C., the ratio of upgrading material [22] coming out of auxiliary reformer [5] to the residue feedstock [6] is increased from 10 to 30 wt/wt and delta coke is reduced to 1 to 3 wt/wt. Due to the advantage of low delta coke, the chances of coke deposition on the riser walls is decreased to large extent.

Endothermic reforming of hydrocarbon streams [20] is carried out with steam and air/oxygen containing gases to yield additional syngas in Auxiliary Reformer [5] by utilizing the heat recovered from upgrading material [18]. The Auxiliary Reformer [5] consists of an inlet means for transferring the rejuvenated upgrading material [18] from the Combustor [4], an exit means for transferring the rejuvenated upgrading material [22] (cooled down to temperature of 650 to 750° C.) to the Riser [1] and a means for transferring the syngas product [21] for further treatment. The Auxiliary Reformer have an option to load the Cerium, Nickel, Rhodium based catalytic material of select size and shape for enhancing the hydrocarbon reforming reactions to produce syngas. The commercial available steam reforming catalyst also can be used in this configuration for carrying out the hydrocarbon steam reforming reactions. In one of the preferred embodiment, the Reformer catalyst material in the Auxiliary Reformer can be simply placed in a staggered/random packed bed. The hydrocarbon stream [20] along with steam and air/oxygen containing gases [19] is passed through the bed of catalyst through a distributor placed at the bottom of the Auxiliary Reformer. The rejuvenated upgrading material [18] percolates through the catalyst bed from top to bottom and thus circulating upgrading material and the reactant flow in a countercurrent manner. The temperature of the Auxiliary Reformer is maintained at least around 50-300° C. below that of the Combustor and 50-100° C. above the cracking reactor temperature. The preferred range of steam to carbon molar ratio to be maintained in the Auxiliary Reformer zone is about 2 to 5. The preferred range of oxygen to carbon molar ratio to be maintained in the auxiliary Reformer zone is 0 to 0.6. Since auxiliary Reformer is used for performing the reforming reactions at lower temperature, water gas shift reaction is also favored.

Figure 2:
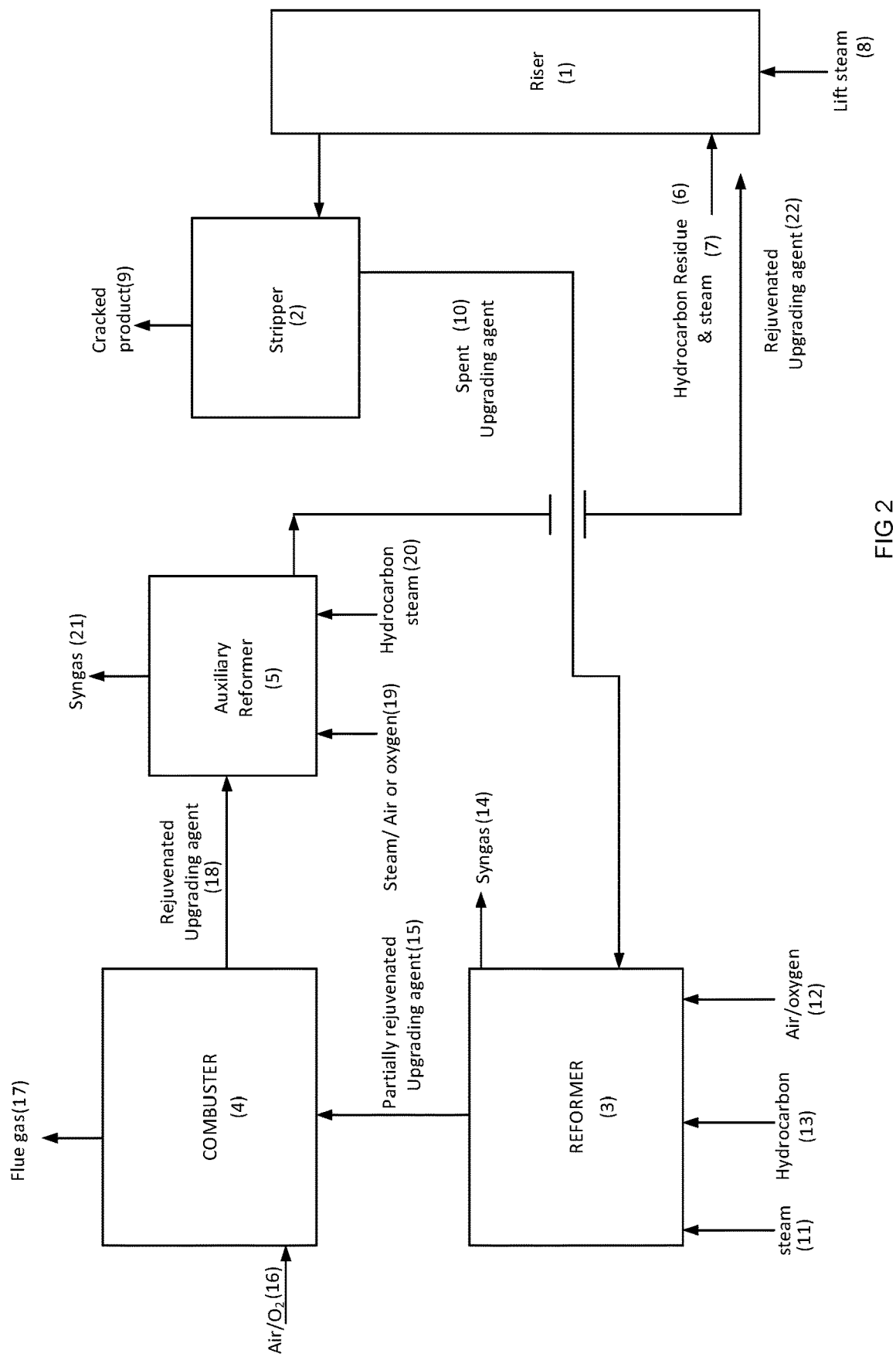
FIG. 2 is a schematic diagram as like scheme-1 with a change in the Reformer which can be operated in absence of $O_2$ containing gases also.

Another aspect of the present invention is to place the Auxiliary Reformer [5A] at the downstream of Reformer [3A], in the flow path of the rejuvenated upgrading material [19A] before entering the Riser [1C] (FIG. 2).

The scheme shown in FIG. 2; is similar to previous scheme explained above with the following changes:
1. Temperature of the Reformer [3A] is maintained by circulating the rejuvenated upgrading material or rejuvenated upgrading agent [18A] from Combustor [4A]. The Reformer [3A] can be operated with steam [11A] alone or along with $O_2$ containing gases as gasifying agent. The syngas produced in the Reformer is rich in hydrogen and typically contains 60-70% Hydrogen, 8-13% CO, 15-28% $CO_2$ and 2-5% methane when steam alone is used as reforming agent. The calorific value of the corresponding syngas is in the range of 220-250 BTU/SCF.
2. Partially rejuvenated upgrading material [15A] from Reformer [3A] is circulated back to riser [1A] via Auxiliary Reformer [5A].

The process includes a cracking zone comprising of riser [1A] and stripper [2A], a two stage regeneration zone comprising of Reformer [3A] and Combustor [4A], a circulation zone comprising of a means for transfer of partially rejuvenated upgrading material/agent [15A] from Reformer [3A] to Combustor [4A] and a means for circulation of the rejuvenated upgrading material [18A] from Combustor to Reformer and a heat removal zone comprising Auxiliary Reformer [5A] at the exit of Reformer [3A] for removing excess heat from the rejuvenated upgrading material [19A] by conducting endothermic reforming of hydrocarbon streams [21A] before being sent to riser [1A] (FIG. 2).

Cracking zone comprise a means for injecting residue hydrocarbon stream [6A], a means for injecting atomizing medium such as steam [7A], a means for injection of lift steam [8A], and a means i.e. transfer line for introducing a rejuvenated upgrading material [23A] into the riser [1A].

Prior to injection of hydrocarbon feedstock oil, the said feedstock is pre-mixed with superheated steam and then dispersed with use of a nozzle by applying a high shear force so that it makes tiny droplets while injecting the same into cracking reactor. Steam dispersion in hydrocarbon reduces hydrocarbon partial pressure, average molecular weight and boiling point of the mixture of hydrocarbons and steam so that the maximum amount of feedstock gets vaporized quickly at feed mix zone temperature. Apart from feed atomization, some amount of steam can also be injected at the downstream of feed injection point to reduce the partial pressure in the cracking reactor. Total Steam to Oil ratio in the present invention will be in the range of 0.3 to 1.5 wt/wt.

The cracked products [9A] and spent upgrading material [10A] will be separated in a Stripper [2A] and the spent upgrading material [10A] is transferred to Reformer [3A] after stripping off the hydrocarbons present in interstitial space and pores of the upgrading material particles. The spent upgrading material [10A] constitutes 1 to 3 wt % coke depending on the type of feed & operating conditions and coke is evenly dispersed on the top of the upgrading material in the form of a thin layer. As the coke produced is in nascent form & is dispersed on the high surface area upgrading material in the form of a thin layer, it is highly reactive.

Partial regeneration of spent upgrading material is carried out by introducing steam [11A] optionally in presence of air/oxygen containing gases [12A] into the Reformer [3A] for production of high quality syngas [14A]. The present invention also provides a method for enhancing the production of syngas [14A] by introducing hydrocarbon stream [13A] into the Reformer [3A]. The partially rejuvenated upgrading material/agent [15A is then transferred to the Combustor [4A] for burning the residual coke with a stream of oxygen containing gases [16A] to produce flue gas [17A] (FIG. 2).

An objective of this scheme (FIG. 2) is to increase the circulation of upgrading material to the Riser [1A] for reducing the delta coke by cooling the rejuvenated upgrading material/agent [19A] coming out of the Reformer [3A] in an Auxiliary Reformer [5A] for carrying out endothermic reforming of hydrocarbon streams [21A] using steam and air/oxygen containing gases [20A] as a reforming agent to produce synthesis gas [22A] before admitting the rejuvenated upgrading material/agent [23A] into Riser [1A]. The rejuvenated upgrading material/agent [23A] is then transferred from auxiliary Reformer [5A] to the riser [1A] by means of a transfer line (FIG. 2).

The hydrocarbon streams injected into the Reformer or Auxiliary reformer in any of the apparatus (FIG. 1 or FIG. 2) may be selected from the cracked products from the Riser.

Accordingly the main embodiment of the present invention relates to a process of increasing syngas production during an upgradation process of petroleum residual oil, the process comprising:
a) introducing spent upgrading agent from a Riser along with steam and air or oxygen containing gases, to a Reformer for production of syngas;
b) burning of residual coke present on partially rejuvenated upgrading agent obtained from the Reformer in a Combustor;
c) introducing rejuvenated upgrading agent from the Combustor, and a hydrocarbon in presence of steam and air or oxygen containing gases to an Auxiliary Reformer for production of additional syngas; and
d) circulating rejuvenated upgrading agent from the Auxiliary Reformer to the Riser.

In other embodiment, the present invention relates a process of increasing syngas production during an upgradation process of petroleum residual oil, the process comprising:
a) introducing spent upgrading agent from a Riser to a Reformer along with steam, optionally air or oxygen containing gases for production of syngas;
b) burning of residual coke present on partially rejuvenated upgrading agent obtained from the Reformer in a Combustor;

c) circulating rejuvenated upgrading agent from the Combustor back to the Reformer;

d) introducing rejuvenated upgrading agent from the Reformer and a hydrocarbon in presence of steam and air or oxygen containing gases to an Auxiliary Reformer for production of additional syngas; and e) circulating rejuvenated upgrading agent from the Auxiliary Reformer to the Riser.

In another embodiment, the Riser is operated at an outlet temperature of 550° C. to 650° C.; the Reformer is operated at a temperature of 700° C. to 850° C. and pressure of 2-30 atm; the Combustor is operated at a temperature in the range of 750° C. to 950° C.; and the Auxiliary Reformer is operated at a temperature range of 650° C. to 750° C.

In one another embodiment, the rejuvenated upgrading material is transferred back from Combustor to the Reformer in order to maintain the temperature of the Reformer by transferring a part of heat generated in the Combustor to Reformer.

In yet another embodiment, the spent upgrading agent is separated from the cracked products obtained from the Riser, in a Stripper prior to introducing to the Reformer.

In still another embodiment, the process of increased production of syngas optionally includes injecting hydrocarbon stream to the Reformer to produce syngas.

In further embodiment, the burning of partially rejuvenated upgrading agent in the Combustor is conducted with a stream of oxygen containing gases.

In furthermore embodiment, the production of syngas in the Auxiliary Reformer is carried out by endothermic reforming of hydrocarbon stream with steam and air or oxygen containing gases, thereby cooling the rejuvenated upgrading material and allowing an increase in the circulation of the rejuvenated upgrading material to the Riser.

In still further embodiment, the circulation of rejuvenated upgrading agent from the Auxiliary Reformer to the Riser allows a delta coke in the range of 1 to 3 wt %.

In yet another embodiment, the process comprises passing the steam and hydrocarbon stream to the Auxiliary Reformer in a ratio of 2 to 5.

In one another embodiment, the rejuvenated upgrading material and the partially rejuvenated upgrading material is a porous fluidizable micro spherical solid particles belonging to Geldart Group A classification.

In still another embodiment, the rejuvenated upgrading material and the partially rejuvenated upgrading material possess particle size in range of 20-200 microns, particle density in the range of 1200-1600 kg/m$^3$ and surface area in the range of 80-400 m$^2$/g wherein the upgrading material comprises of microspheres composed of alumina, silica alumina, silica-magnesia, kaoline clay or mixture thereof. The upgrading material may be selected from the group comprising of spent or equilibrium catalyst generated from FCC or RFCC unit, high active fresh zeolite catalyst of FCC or RFCC.

In another embodiment, the spent upgrading material has 1-3 wt % coke evenly dispersed on the top of the upgrading material in form of a thin layer.

In further embodiment, the Auxiliary Reformer is maintained at a temperature in the range of 50° C. to 300° C. below the Combustor, and 50° C. to 100° C. above the Riser.

In furthermore embodiment, the present invention relates to a system for increasing syngas production during an upgradation process of petroleum residual oil, the system comprising:

a) a cracking zone comprising a Riser [1, 1A], with means for injecting hydrocarbon residue [6, 6A], means for injecting fluidizing cum atomizing medium including steam [7, 7A], means for injecting lift steam [8, 8A], transfer line for injecting rejuvenated upgrading material [22, 23A] and a Stripper [2, 2A] for separating the cracked products [9, 9A] and spent upgrading material [10, 10A];

b) a two stage regeneration zone comprising of a Reformer [3, 3A] and a Combustor [4, 4A]; and c) a heat removal zone comprising an Auxiliary Reformer [5, 5A] for producing additional syngas by reforming of hydrocarbon stream while utilizing excess heat removed from rejuvenated upgrading material [18, 19A].

In a preferred embodiment, the Auxiliary Reformer [5] is placed at downstream of Combustor [4]. In one another preferred embodiment, the Auxiliary Reformer [5A] is placed at downstream of Reformer [3A].

In still another embodiment, the Reformer [3, 3A] comprises of means for transferring the partially rejuvenated upgrading material [15, 15A] to the Combustor [4, 4A] wherein the means involves lift line.

Also, the Auxiliary Reformer [5, 5A] optionally comprises of distributor placed at bottom of the Auxiliary Reformer.

In other embodiment, the present invention relates to a process for increasing syngas production during an upgradation process of petroleum residual oil, the process comprising the steps of:

a) injecting a hydrocarbon residue feedstock [6] in form of droplets into a Riser [1] operating at an outlet temperature of 550° C. to 650° C., wherein said hydrocarbon residue feedstock is pre-mixed with a superheated steam [7] before injecting into the Riser;

b) cracking the hydrocarbon residue feedstock [6] of step (a) by contacting with a rejuvenated upgrading material [22] along length of the Riser [1] to obtain cracked products [9] and spent upgrading material [10];

c) separating the cracked products [9] and the spent upgrading material [10] in a Stripper [2];

d) transferring the spent upgrading material [10] to a Reformer [3];

e) conducting partial regeneration of spent upgrading material in the Reformer [3] by introducing a steam [11] and air/oxygen containing gases [12] at a temperature range of 700° C. to 850° C. and pressure of 2-30 atm to produce syngas [14];

f) optionally, injecting hydrocarbon stream [13] to the Reformer [3] to produce additional quantity of the syngas [14];

g) transferring a partially rejuvenated upgrading material [15] from Reformer [3] to Combustor [4];

h) burning of residual coke from the partially rejuvenated upgrading material in the Combustor [4] with a stream of oxygen containing gases [16] at a temperature in the range of 750° C. to 950° C. to obtain flue gas [17] and a rejuvenated upgrading material [18].

i) transferring the rejuvenated upgrading material [18] from Combustor [4] to an Auxiliary Reformer [5];

j) carrying out endothermic reforming of hydrocarbon stream [20] with steam and air/oxygen containing gases [19] in the Auxiliary Reformer [5] at a temperature range of 650° C. to 750° C. [18] and to produce syngas [21] which enables to increase circulation of the rejuvenated upgrading material [22] coming from the Auxiliary Reformer [5] and thereby achieving lower delta coke; and k) transferring the rejuvenated upgrading material [22] from Auxiliary Reformer [5] to the Riser [1].

In another embodiment, the present invention relates to a process increase in syngas production during an upgradation process of petroleum residual oil, the process comprising the steps of:

a) injecting a hydrocarbon residue feedstock [6A] in form of droplets into a Riser [1A] operating at an outlet temperature of 550° C. to 650° C., wherein said hydrocarbon residue feedstock is pre-mixed with a superheated steam [7A] before injecting into the Riser;

b) cracking the hydrocarbon residue feedstock [6A] of step (a) by contacting with a rejuvenated upgrading material [23A] along length of the Riser [1A] to obtain cracked products [9A] and spent upgrading material [10A];

c) separating the cracked products [9A] and the spent upgrading material [10A] in a Stripper [2A];

d) transferring the spent upgrading material [10A] to a Reformer [3A];

e) conducting partial regeneration of the spent upgrading material in Reformer [3A] by introducing steam [11A] optionally in presence of air/oxygen containing gases [12A] at a temperature range of 700° C. to 850° C. and pressure of 2-30 atm to produce syngas [14A];

f) optionally, injecting hydrocarbon stream [13A] to the reformer [3A] to produce additional quantity of syngas [14A];

g) transferring partially rejuvenated upgrading material [15A] from Reformer [3A] to a Combustor [4A];

h) burning of residual coke from the partially rejuvenated upgrading material [15A] in the Combustor [4A] with a stream of oxygen containing gases [16A] at a temperature in the range of 750° C. to 950° C. to obtain flue gas [17A] and a rejuvenated upgrading material [18A].

i) transferring the rejuvenated upgrading material [18A] from the Combustor [4A] back to the Reformer [3A] in order to transfer a part of heat generated in the Combustor [4A] to Reformer [3A];

j) transferring a rejuvenated upgrading material [19A] from the Reformer [3A] to an Auxiliary Reformer [5A];

k) carrying out endothermic reforming of hydrocarbon stream [21A] with steam and air/oxygen containing gases [20A] in the Auxiliary Reformer [5A] at a temperature range of 650° C. to 750° C. [19A] and produce syngas [22A] which enables to increase circulation of the upgrading material [23A] coming from the Auxiliary Reformer [5A] and thereby achieving lower delta coke; and l) transferring rejuvenated upgrading material [23A] from Auxiliary Reformer [5A] to the Riser [1A].

In further embodiment, the hydrocarbon residue [6] and [6A] in step (a) is pre-mixed with superheated steam [7] and [7A] respectively, with a steam to hydrocarbon residue ratio in the range of 0.3 to 1.5 wt/wt.

In furthermore embodiment, the hydrocarbon residue feedstock [6] and [6A] comprises of concarbon, nickel, vanadium, sodium, nitrogen and sulfur impurities.

In further embodiment, the Auxiliary Reformer [5] and [5A] includes endothermic reforming of hydrocarbon stream [21] and [21A] respectively, to generate additional syngas [22] and [22A] respectively.

In furthermore embodiment, the syngas [14, 14A, 22, 22A] comprises of 60-70% hydrogen, 8-13% carbon monoxide, 15-28% carbon dioxide and 2-5% methane, and the calorific value of said syngas is in the range of 220-250 BTU/SCF.

In a preferred embodiment, the endothermic reforming in Auxiliary Reformer [5] and [5A] is carried out by utilizing heat recovered from cooling of the rejuvenated upgrading material [18] and [19A] respectively along with steam and Air/oxygen.

In one another embodiment, the Auxiliary Reformer [5] and [5A] optionally uses cerium, nickel and rhodium based catalytic material for enhancing the reforming of the hydrocarbon stream [21] and [21A] to produce additional syngas [22] and [22A] respectively.

In a preferred embodiment, the catalytic material based on cerium, nickel and rhodium is placed in a staggered/random packed bed.

EXAMPLES

Example—1 Illustrates the Improved Circulation Rate of Upgrading Material Thereby Reduced Coke Deposition Level on the Upgrading Material of the Present Process Coke deposition level on the upgrading material is very important in residue cracking followed by regeneration operations. Lower coke deposition level on the upgrading material is even more important while regeneration by gasification route. Higher coke deposition level on the upgrading material leads to increased chances of coke deposition on the walls of riser and increased diffusion resistance during the regeneration making it difficult to regenerate in a given time. Improved circulation rate of upgrading material minimizes these difficulties and improves the process viability.

As long as Riser temperature and feed pre-heat temperature are kept constant, the heat demand and coke production in the Riser is fairly constant irrespective of the temperature of the upgrading material at the inlet of Riser.

Circulation rate of upgrading material through Riser increases if the temperature of the upgrading material at the inlet of Riser is lowered as summarized below. In this example, Combustor & Riser are operated at 950° C. & 650° C. respectively. With the use of Auxiliary Reformer, whose operating temperature is 750° C., circulation rate of upgrading material through Riser increases by three times as that of process carried out without Auxiliary Reformer.

TABLE 1

| Reference FIG.-1 | Process (without Auxiliary Reformer) | Present Invention (with Auxiliary Reformer) |
|---|---|---|
| Combustor temp, ° C. | 950 | 950 |
| Gasifier/Reformer temp, ° C. | 850 | 850 |
| Auxiliary Reformer temp, ° C. | — | 750 |
| Riser reactor temp, ° C. | 650 | 650 |
| Differential temp between Combustor and Riser reactor, ° C. | DT1 = 300 | DT2 = 100 |

TABLE 1-continued

| Reference FIG.-1 | Process (without Auxiliary Reformer) | Present Invention (with Auxiliary Reformer) |
|---|---|---|
| Upgrading Material/Solid Circulation rate, unit mass per heat | M1 | M2 |
| Heat demand in riser (Specific heat of catalyst (Cp) fairly) | $Q = M1 \times Cp \times DT1$ ---Eq(1) | $Q = M2 \times Cp \times DT2$ ----Eq(2) |
| Since heat demand in riser reactor does not change significantly, Eq 1 & 2 will be same | | → $M2 \times Cp \times DT2 = M1 \times Cp \times DT1$<br>→ $M2 = M1 \times 300/100$<br>→ $M2 = 3$ times of M1 |
| Coke production = Coke consumed during regeneration step, unit mass/hr | C | C |
| Coke deposition, % on Upgrading Material | $A = C/M1 \times 100$ | $B = C/M2 \times 100$<br>Substitute M2 value i.e., 3×M1<br>→ $B = C/(3 * xM1) * 100$ |
| Reduction of coke deposition level | | → B/A<br>→ ⅓<br>→ 3 times reduction in coke deposition level over prior art |

Example—2 Illustrates the Improved Yield of Syngas in the Present Process

A comparison is performed with the processes without Auxiliary Reformer and the present invention with an Auxiliary Reformer. Coke produced in the Riser is partially converted to syngas and flue gas in Gasifier/Reformer and Combustor respectively. The reactions carried out in the Combustor are highly exothermic and hence, heat is produced.

The excess heat produced in the Combustor is transferred to Riser (Consider FIG.-1 without Auxiliary Reformer). There is no need to transfer the heat to Gasifier/Reformer in this embodiment as it is self-sufficient to generate the required heat by converting a part of coke to CO and $CO_2$ using oxygen containing gases.

Some amount of heat produced from Combustor (Consider FIG.-2 without Auxiliary Reformer) is also transferred to Gasifier/Reformer as the amount oxygen containing gases fed to Gasifier/Reformer is inadequate to produce the require heat. In this case, more amount of coke has to be combusted in Combustor to meet the heat demand of Riser and Gasifier/Reformer.

In both the cases, the percent coke converted to syngas varies depending on the yield of coke. The syngas produced in either of the cases is limited by the production of coke. If more coke is produced, more syngas is generated.

By providing Auxiliary Reformer, one can overcome this limitation as it is operated independent of coke production. Hydrocarbon stream can be converted in Auxiliary Reformer to produce additional syngas. A part of the hydrocarbon stream can also be converted to CO and $CO_2$ using oxygen containing gases for production of the required heat.

The invention claimed is:

1. A process of increasing syngas production during an upgradation process of petroleum residual oil, the process comprising:
    a) introducing spent upgrading agent from a Riser to a Reformer along with steam and air or oxygen containing gases for production of syngas;
    b) burning of residual coke present on partially rejuvenated upgrading agent obtained from the Reformer in a Combustor;
    c) introducing rejuvenated upgrading agent from the Combustor, and a hydrocarbon in presence of steam and air or oxygen containing gases to an Auxiliary Reformer having cerium, nickel and rhodium based reforming catalyst for production of additional syngas; and
    d) circulating rejuvenated upgrading agent from the Auxiliary Reformer to the Riser;
        wherein, the Riser is operated at an outlet temperature of 550° C. to 650° C.; the Reformer is operated at a temperature of 700° C. to 850° C. and pressure of 2-30 atm; the Combustor is operated at a temperature in the range of 7500° to 950° C.; and the Auxiliary Reformer is operated at a temperature range of 650° C. to 750° C.;
        wherein, the rejuvenated upgrading agent and partially rejuvenated upgrading agent is a porous fluidizable micro spherical solid particles belonging to Geldart Group A classification;
        wherein, the Auxiliary Reformer is maintained at a temperature in the range of 50° C. to 300° C. below the Combustor, and 50° C. to 100° C. above the Riser.

2. The process as claimed in claim 1, wherein the spent upgrading agent is separated from the cracked products obtained from the Riser, in a Stripper, prior to introducing to the Reformer.

3. The process as claimed in claim 1, comprising optionally injecting hydrocarbon stream to the Reformer to produce syngas.

4. The process as claimed in claim 1, wherein the burning of residual coke present on partially rejuvenated upgrading agent in the Combustor is conducted with a stream of oxygen containing gases.

5. The process as claimed in claim 1, wherein the production of syngas in the Auxiliary Reformer is carried out by endothermic reforming of hydrocarbon stream with steam and air or oxygen containing gases, thereby cooling the rejuvenated upgrading material and allowing an increase in the circulation of the rejuvenated upgrading material to the Riser.

6. The process as claimed in claim 1, wherein the circulation of rejuvenated upgrading agent from the Auxiliary Reformer to the Riser allows a delta coke in the range of 1 to 3 wt %.

7. The process as claimed in claim 1, wherein the process comprises passing the steam and hydrocarbon stream to the Auxiliary Reformer in a ratio of 2 to 5.

8. The process as claimed in claim 1, wherein the rejuvenated upgrading material and partially rejuvenated upgrading material has a particle size in the range of 20-200 microns, particle density in the range of 1200-1600 kg/m$^3$ and surface area in the range of 80-400 m$^2$/g and comprises of microspheres composed of alumina, silica alumina, kaoline clay or mixture thereof.

9. The process as claimed in claim 1, wherein the residual oil comprises of concarbon, nickel, vanadium, sodium, nitrogen and sulfur impurities.

10. A process of increasing syngas production during an upgradation process of petroleum residual oil, the process comprising:
   a) introducing spent upgrading agent from a Riser to a Reformer along with steam, optionally air or oxygen containing gases for production of syngas;
   b) burning of residual coke present on partially rejuvenated upgrading agent obtained from the Reformer in a Combustor;
   c) circulating rejuvenated upgrading agent from the Combustor back to the Reformer;
   d) introducing rejuvenated upgrading agent from the Reformer, and a hydrocarbon optionally in presence of steam and air or oxygen containing gases to an Auxiliary Reformer having cerium, nickel and rhodium based reforming catalyst for production of additional syngas; and
   e) circulating rejuvenated upgrading agent from the Auxiliary Reformer to the Riser;
      wherein, the Riser is operated at an outlet temperature of 550° C. to 650° C., the Reformer is operated at a temperature of 700° C. to 850° C. and pressure of 2-30 atm; the Combustor is operated at a temperature in the range of 750° C. to 950° C.; and the Auxiliary Reformer is operated at a temperature range of 650° C. to 750° C.;
      wherein, the rejuvenated upgrading agent and partially rejuvenated upgrading agent is a porous fluidizable micro spherical solid particles belonging to Geldart Group A classification;
      wherein the Auxiliary Reformer is maintained at a temperature in the range of 50° C. to 300° C. below the Combustor, and 50° C. to 100° C. above the Riser.

11. The process as claimed in claim 10, wherein circulating the rejuvenated upgrading material from the Combustor back to the Reformer maintains the temperature of the Reformer by transferring a part of heat generated in the Combustor to Reformer.

* * * * *